(12) United States Patent
Liu et al.

(10) Patent No.: US 6,748,133 B2
(45) Date of Patent: Jun. 8, 2004

(54) COMPACT MULTIPLEXING/DEMULTIPLEXING MODULES

(75) Inventors: Yuqiao Liu, Sunnyvale, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 219 days.

(21) Appl. No.: 09/994,367

(22) Filed: Nov. 26, 2001

(65) Prior Publication Data

US 2003/0099434 A1 May 29, 2003

(51) Int. Cl.[7] .................................................. G02B 6/28
(52) U.S. Cl. .............................. 385/24; 385/15; 385/31; 385/34; 398/85; 398/88
(58) Field of Search ............................... 385/24, 15, 16, 385/17, 18, 31, 33, 34; 398/79, 85, 88

(56) References Cited

U.S. PATENT DOCUMENTS

| | | | | |
|---|---|---|---|---|
| 6,198,857 B1 | * | 3/2001 | Grasis et al. ................ | 385/24 |
| 6,418,250 B1 | * | 7/2002 | Corbosiero et al. ........... | 385/24 |
| 6,636,654 B2 | * | 10/2003 | McGuire, Jr. ................ | 385/17 |
| 2003/0099434 A1 | * | 5/2003 | Liu et al. ..................... | 385/31 |
| 2003/0206688 A1 | * | 11/2003 | Hollars et al. ................ | 385/24 |

* cited by examiner

*Primary Examiner*—Brian M. Healy
(74) *Attorney, Agent, or Firm*—Joe Zheng; C. P. Chang; Pacific Law Group, LLP

(57) ABSTRACT

Improved designs of optical multiplexing/demultiplexing module are disclosed for use in multiplexing a composite optical signal into respective individual channels or wavelengths or demultiplexing individual channels or wavelengths into a composite optical signal. According to one embodiment, the optical multiplexing/demultiplexing module comprises an array of collimators, an array of optical filters and an array of mirrors. The collimators are boned to a common substrate after being aligned with a respect optical filter. Different from the prior art devices, the aligned positions of the collimators are secured or held up by preformed wedges. A bonding agent is then applied only to respective contacts between the collimators and the wedges. The wedges are further bonded to a common substrate to secure the collimators.

18 Claims, 5 Drawing Sheets

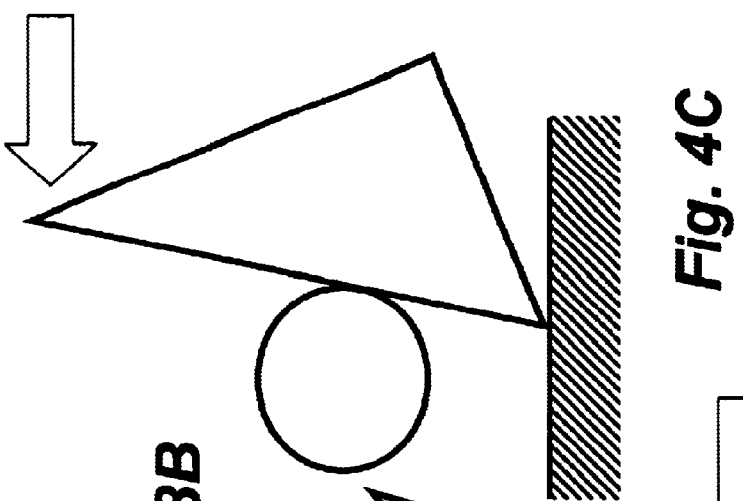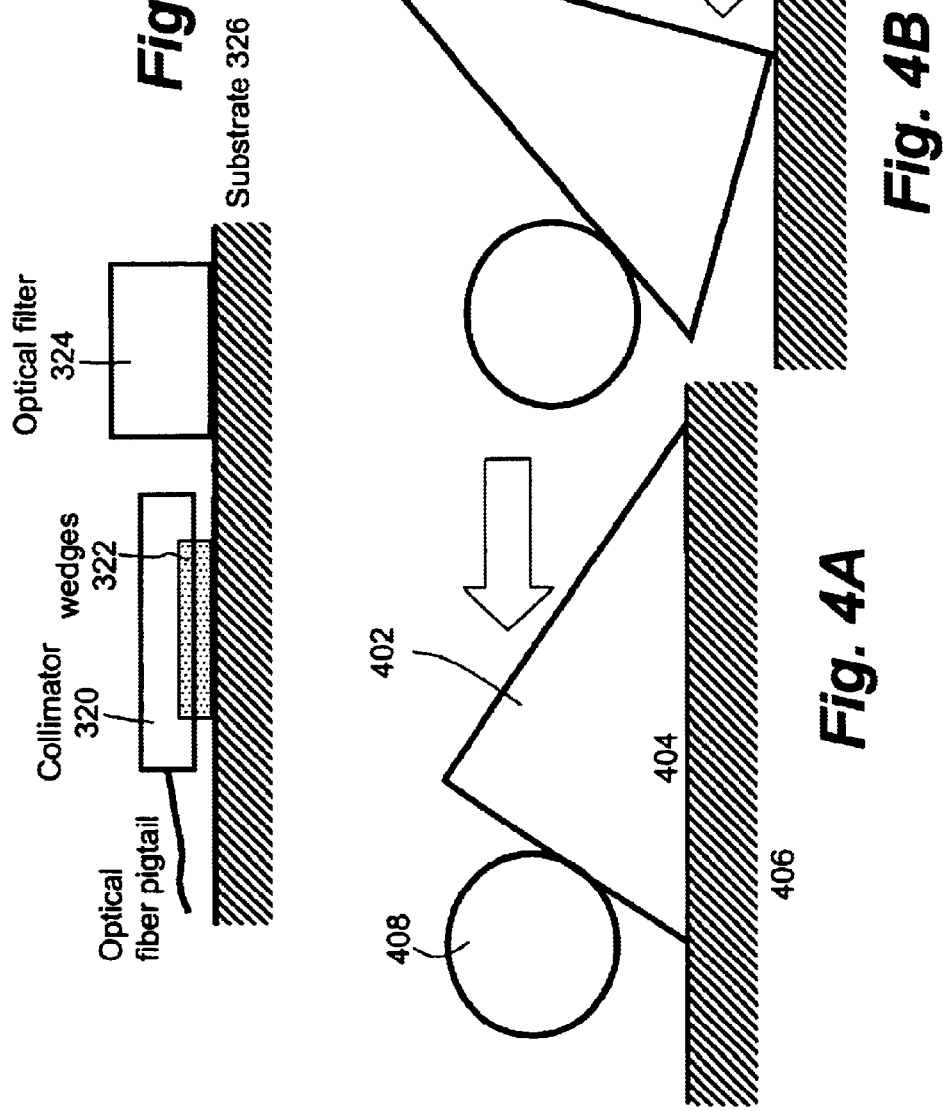

COMPACT MULTIPLEXING/DEMULTIPLEXING MODULES

CROSS-REFERENCE TO RELATED APPLICATION

This application is related to U.S. application Ser. No. 09/990,487, entitled "Method for Bonding Aligned Optical Parts and Apparatus thereof", commonly assigned, filed Nov. 16, 2001, which is hereby incorporated by reference.

BACKGROUND OF THE INVENTION

1. Field of the Invention

The invention is generally related to the area of optical communications. In particular, the invention is related to method and apparatus for a single optical module for multiplexing/demultiplexing optical signals by using wedges to bond various components to one or more common substrates.

2. The Background of Related Art

The future communication networks demand ever increasing bandwidths and flexibility to different communication protocols. WDM (Wavelength Division Multiplexing) is one of the key technologies for such optical fiber communication networks. WDM employs multiple wavelengths in a single fiber to transmit in parallel different communication protocols and bit rates. Transmitting several channels in a single optical fiber at different wavelengths can multi-fold expand the transmission capacity of the existing optical transmission systems, and facilitating many functions in optical networking. An international standard wavelength grid has been suggested by ITU (International Telecommunication Union) for the center wavelengths of DWDM systems. Different technologies have been developed to divide or combine channels or subgroups of channels in the ITU grid.

From a terminology's viewpoint, a device that multiplexes different wavelength channels or groups of channels into one fiber is a multiplexer, and a device that divides the multiplexed channels or groups of channels into individual or subgroups of channels is a demultiplexer. Specifically, when a multiplexer combines several channels of optical signals into a single signal, or in reverse a demultiplexer separates a single multichannel signal into several individual channel signals, such multiplexer/demultiplexer is referred to a multiplexing/demultiplexing module, or simply multiplexer or demultiplexer.

Known devices for multiplexing/demultiplexing have employed, for example, diffraction gratings, arrayed waveguide gratings and various types of fixed or tunable filters. Gratings typically require complicated alignment systems and have been found to provide poor efficiency and poor stability under changing ambient conditions. Fixed wavelength filters, such as interference coatings, can be made substantially more stable, but transmit only a single wavelength or wavelength band.

U.S. Pat. No. 5,583,683 to Scobey discloses an optical multiplexing device that spatially disperses collimated light from a fiber optic waveguide into individual wavelength bands, or multiplexes such individual wavelength bands to a common fiber optic waveguide or other destination. An optical block has an optical port for passing multiple wavelength collimated light to be demultiplexed. Multiple ports are arrayed in spaced relation to each other along a multiport surface of the optical block to receive respective the individual wavelength bands. With respective collimators that must be precisely coupled to the multiple ports, the optical multiplexing device can be bulky, expensive and susceptible to varying ambient conditions (e.g. temperature and vibrations).

There has always been a need for an optical multiplexing device that is small in size, low in cost, and remains stable in varying working conditions.

SUMMARY OF THE INVENTION

The present Invention pertains to improved designs of optical multiplexing/demultiplexing module used to demultiplex a composite optical signal into respective individual channels or wavelengths or to multiplex individual channels or wavelengths into a composite optical signal. According to one aspect of the present invention, the optical multiplexing/demultiplexing module comprises an array of collimators, an array of optical filters and an array of mirrors. The collimators are bonded to a common substrate after being aligned with a respective optical filter. Different from the prior art devices, the aligned positions of the collimators are secured or held up by preformed wedges. A bonding agent is then applied only to respective contacts between the collimators and the wedges. The wedges are further bonded to a common substrate to secure the collimators. In one embodiment, the optical filters as well as the mirrors that have been aligned with the collimators may be also bonded to the substrate. As a result, integrated multiplexing/demultiplexing modules can be configured small in size and easy to be assembled or manufactured. Because all components are bonded or fixed to one or more common substrates, the resultant multiplexing-demultiplexing modules can remain stable in varying working condition.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 3B shows that a collimator is being positioned by wedges after the collimator has been aligned with an optical component or device (e.g. the optical filter);

FIG. 4A shows that the cross-section of the shape of a wedge used to support positions of the collimator is substantially close to a right triangle;

FIG. 4B and FIG. 4C show respectively that two other possible placements of the wedge that could flip over or up the already aligned collimators;

DETAILED DESCRIPTION OF THE PREFERRED EMBODIMENT

The present invention pertains to designs of Multiplexing/Demultiplexing modules for optical data communication. One of the features in the present invention is that the modules are presented in an integrated form that is easy to manufacture, low in cost and remains stable in varying working conditions. According to one aspect of the present invention, an array of collimators receiving respective demultiplexed channels or wavelength bands are secured and/or bonded to one or more common substrates using wedges. To facilitate the multiplexing or demultiplexing, optical filters and mirrors are also affixed in the substrate(s). As a result, an integrated multiplexing/demultiplexing module can be configured small in size and easy to assemble or manufacture. Because all components are bonded or fixed to one or more common substrates, the resultant multiplexing/demultiplexing modules remains stable in varying working conditions.

The detailed description of the present invention is presented largely in terms of procedures, steps, logic blocks, processing, or other symbolic representations that directly or indirectly resemble the operations of optical devices or systems that can be used in optical networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
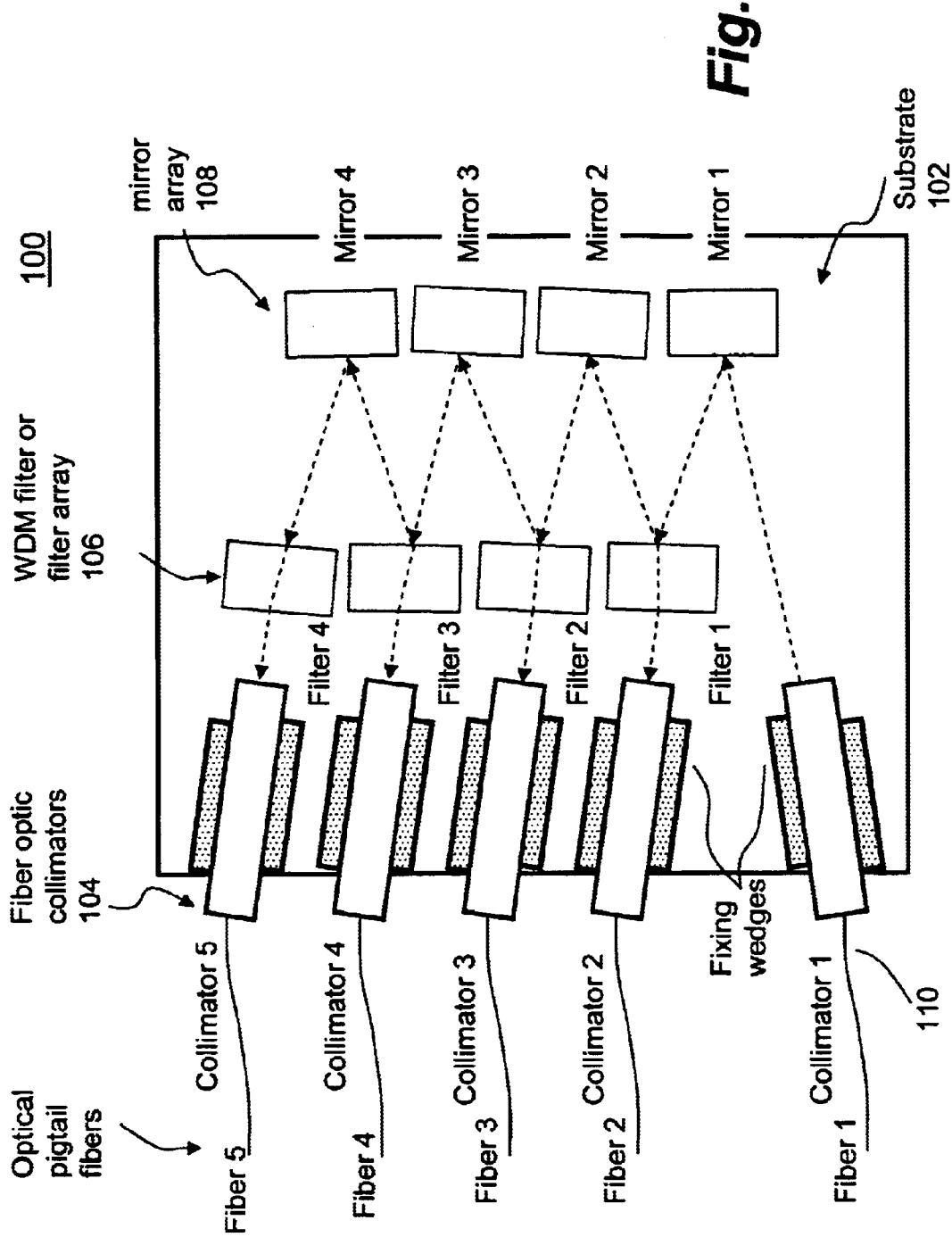
FIG. 1 shows a multiplexing/demultiplexing module according to one embodiment of the present invention.

Referring now to the drawings, in which like numerals refer to like parts throughout the several views. FIG. 1 shows a multiplexing/demultiplexing module 100 according to one embodiment of the present invention. The multiplexing/demultiplexing module 100 comprises substrate 102, an array of collimators 104, an array of filters 106 and an array of mirrors 108. In one embodiment, the substrate 102 is satinless steel. The array of collimators 104 includes a number of individual collimators and the number is related to the number of individual wavelengths the multiplexing/demultiplexing module 100 is designed to multiplex or demultiplex. For example, an incoming multiplexed WDM signal coupled to a port 110 of Collimator 1 is a multiplexed four-channel WDM signal (i.e. four different wavelengths $\lambda_1\lambda_2\lambda_3\lambda_4$ in one WDM signal).

Figure 2:
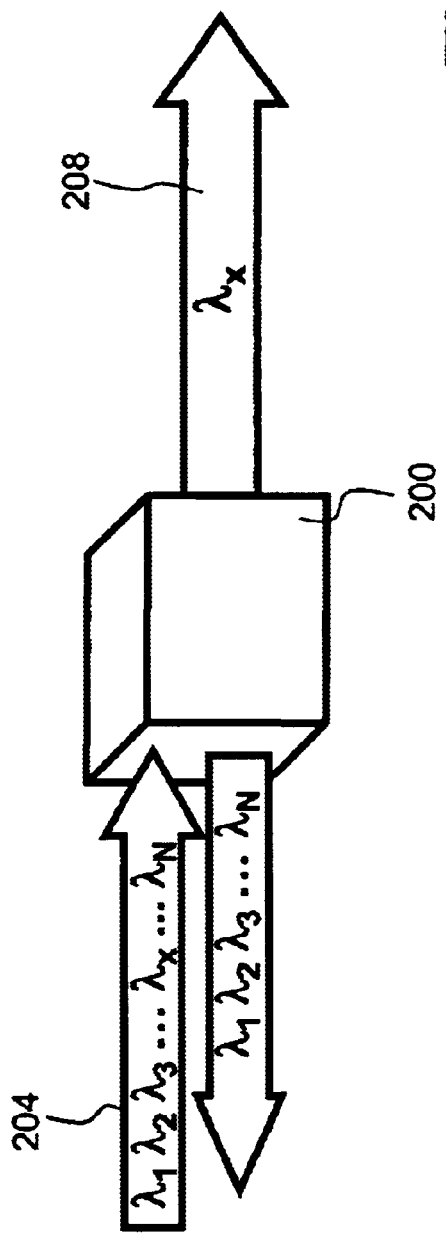
FIG. 2 illustrates spectral characteristics of an optical filter used in the multiplexing/demultiplexing module shown in FIG. 1.

To facilitate the description of the present invention and without the loss of generality, it is assumed that the incoming multiplexed WDM signal to the port 110 includes 4 channels (e.g. channel 1, 2, 3 and 4) or wavelengths (e.g. $\lambda_1\lambda_2\lambda_3\lambda_4$) successively and closely located over a spectrum band. Accordingly, as shown in the figure, the array of filters 106 includes four filters, each of the filters has a spectral response that passes only one channel and rejects or reflects others as shown in FIG. 2. It should be noted that there are means for optically achieving such spectral response, namely to selectively pass only one wavelength $\lambda_x$ among received multiple wavelengths $\lambda_1\ \lambda_2\ \lambda_3\ldots\lambda_x\ldots\lambda_N$. The individual filters 106 illustrated in FIG. 1 shall not be interpreted as a limitation to the present invention. Multiple filters may be used to achieve the required spectral response. An example of products that can achieve the required spectral response are bandpass filters from OCLI with a link of http://www.ocli.com/products/infrared filters.html The array of mirrors 108 includes four individual high reflection mirrors, each corresponding to one of the filters 106. In operation, the incoming multiplexed WDM signal (e.g. $\lambda_1\lambda_2\lambda_3\lambda_4$) coupled to a port 110 of Collimator 1 is first reflected to Filter 1 by Mirror 1, Filter 1 has the spectral response to transmit $\lambda_1$ and hence $\lambda_1$ is coupled out of the module 100 via Collimator 2. At the same time, the rest of the signal that is reflected by Filter 1, now includes $\lambda_2\lambda_3\lambda_4$ and is reflected by Mirror 2 to Filter 2 that has the spectral response of transmitting $\lambda_2$ that is coupled out of module 100 via Collimator 3. Now the reflected signal from Filter 2 has $\lambda_3\lambda_4$ that are reflected to Filter 3 by Mirror 3. Filter 3 has the spectral response of transmitting $\lambda_3$, so $\lambda_3$ is coupled out of module 100 via Collimator 4. The signal reflected by Filter 3 now has only $\lambda_4$ that is directed to Filter 4 with the spectral response of transmitting $\lambda_4$. Subsequently, $\lambda_4$ is coupled out of module 100 via Collimator 5.

Figure 3A:
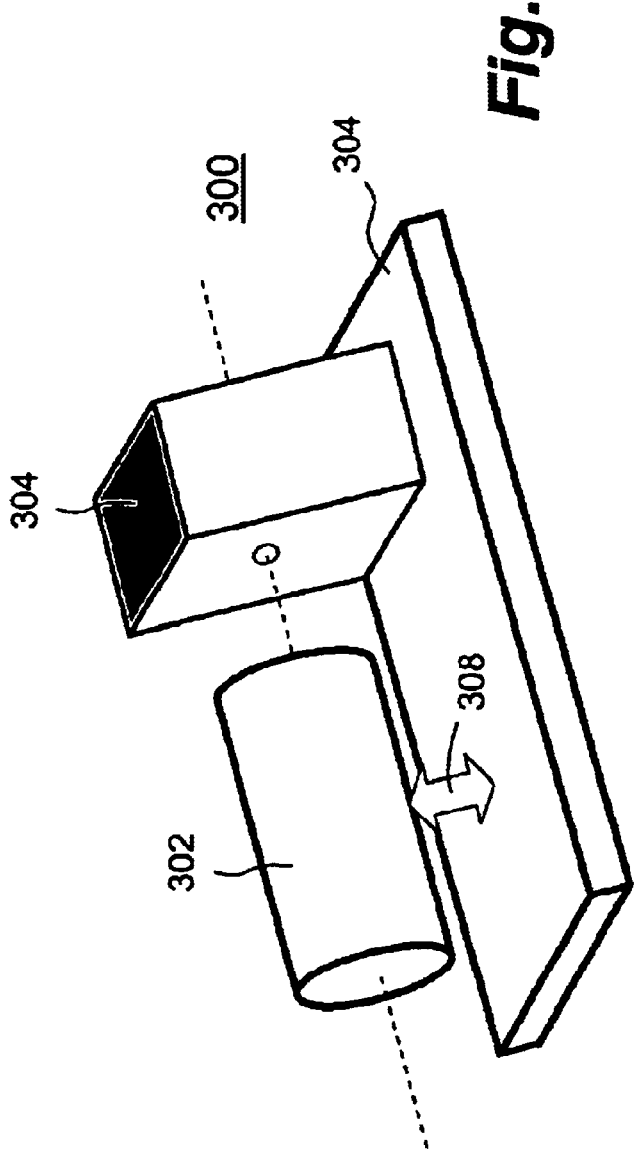
FIG. 3A shows a setting in which a collimator is being aligned with an optical component (e.g. an optical filter or a mirror)

Referring now to FIG. 3A, there is shown a setting 300 in which a collimator 302 is being aligned with a filter 304. The collimator 302 may correspond to one of the collimators in the array of collimators 102 of FIG. 1 and the filter 304 may correspond to one of the filters in the array of filters 104 of FIG. 1. As understood from FIG. 1, the alignment of the collimator 302 with the filter 304 needs to be performed precisely to avoid optical signal loss/distortion. In one exemplary alignment procedure, the collimator 302 is elevated a small distance 308 (i.e. gaps) from the substrate 306 so that adjustment of the collimator 302 can be performed with respect to the filter 304. Once the alignment of the two optical parts is done, the prior art method is to apply a kind of bonding agent, such as epoxy or solder, to fill in the gaps between the aligned optical parts and/or between the aligned optical part and the substrate.

In reality, however, it has been noticed that the filling material, either the bonding agent or the solder, can shrink when it is dried out or cool down, resulting in an undesirable alternation or disturbance to the positions of the originally aligned optical parts.

According to one aspect of the present invention, the gaps illustrated in FIG. 3A is not to be filled with any agent, instead, two or more preformed wedges are used to hold up the originally aligned collimator 302 when a boding agent is applied. To bond collimator 302 to the wedges, a small amount of a bonding agent (e.g. epoxy) is used but only applied to respective contacts between the optical parts and the wedges. At the same time, the wedges are bonded to the substrate 306. Because the amount of the bonding agent is small and the wedges primarily position the optical parts, the alignment of the optical parts is preserved. In fact, the use of the wedges can sustain the alignment under very high environmental stresses (e.g. varying temperatures and vibrations).

FIG. 3B shows that a collimator 320 is being positioned by wedges 322 after the collimator 320 has been aligned with an optical component or device 324 (e.g. the optical filter). The gaps between the collimator 320 and the substrate 326 are created for aligning the collimator 320 with the device 324. As shown in the figure, the wedges 322 are used to fill in the gaps and at the same time to hold up the positions of the collimator 320 to maintain the alignment.

According to one embodiment of the present invention, the cross-section of the shape of the wedges used to support the position of the collimator is substantially close to a right triangle as illustrated in FIG. 4A. The triangle 400 has the hypotenuse 402 facing a substrate 404. In operation, once the alignment is done, the positions of the collimator 408 shall be preserved. The wedges (the cross-section thereof shown as 402) are respectively slid in from two different directions to hold up the positions of the collimator 408 when a boding agent is applied. To avoid possible flipping over or up the already aligned collimator 408 as shown respectively in FIGS. 4B and 4C, the wedge is slid in with the sliding face (formed by the hypotenuse of the right triangle) towards the substrate 404. According to one embodiment, a small amount of a bonding agent is applied to only the respective contacts between the contacting surfaces of the optical parts and the wedges. The wedges are also fastened to the substrate by a bonding means (e.g. adhesive or solder).

Figure 5:
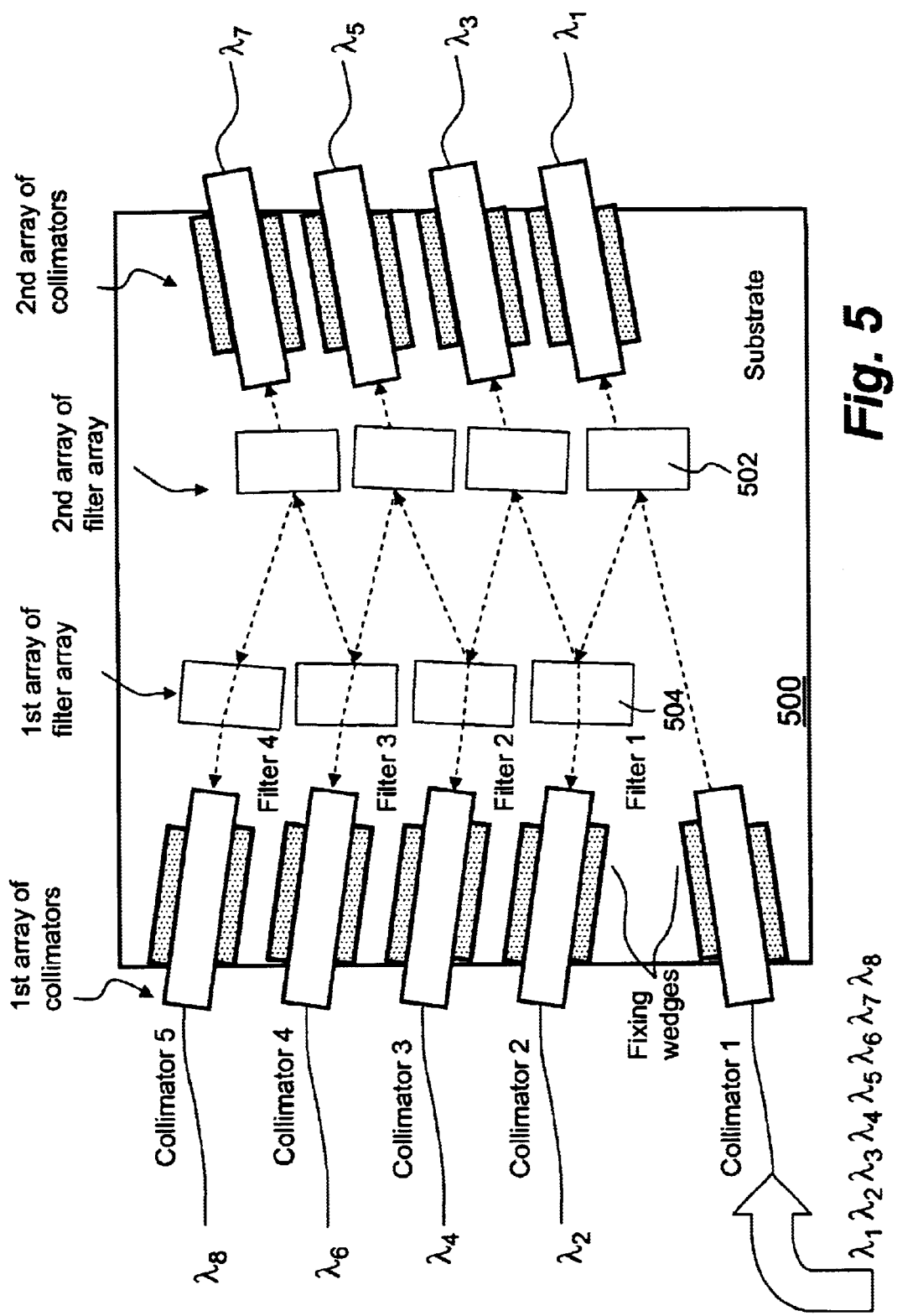
FIG. 5 shows another possible embodiment according to the present invention.

Given the description herein, those skilled in the art can configure different types of multiplexing/demultiplexing modules without departing the scopes of the present invention. FIG. 5 illustrates an alternative embodiment 500 of an multiplexing/demultiplexing module that essentially replace the array of mirrors with a second array of filters. As a result, another array of collimators can be placed to receive additional set of respective wavelengths. For example, a multiplex optical signal including eight different wavelengths (e.g. $\lambda_1\lambda_2\lambda_3\lambda_4\lambda_5\lambda_6\lambda_7\lambda_8$) come to Collimator 1. The optical signal is coupled to the filter 502 that transmits $\lambda_1$ and the rest is reflected to the filter 504 that transmits $\lambda_1$ and reflects the rest. The rest of the signal continues to travel through the rest of the filters and every time the signal hits a filter, a wavelength is filtered out. As it can be understood, the collimators in the module 500 are also positioned by respective wedges and the wedges are fastened to a common substrate.

Figure 6:
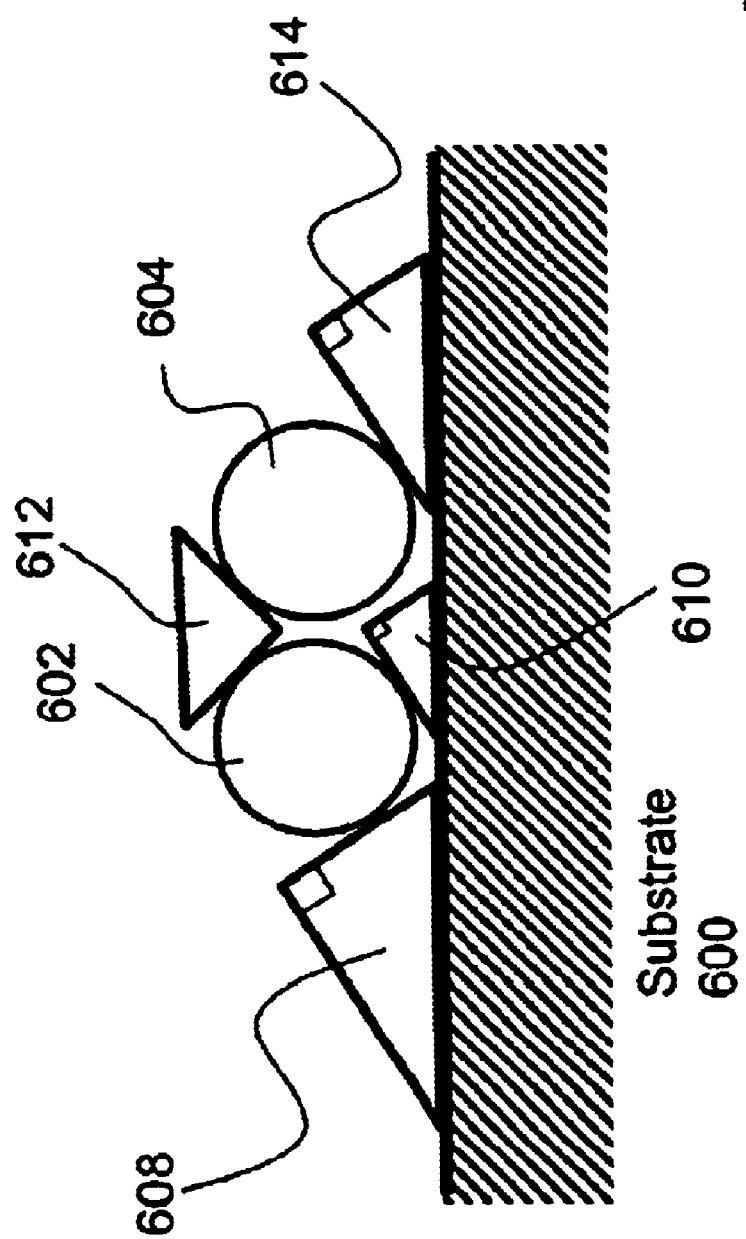
FIG. 6 shows an exemplary setting in which two parallel collimators are being bonded to a substrate with four wedges.

Referring now to FIG. 6, there is shown a setting in which two parallel collimators 602 and 604 are being bonded to a substrate 600 with 4 wedges 608, 610, 612 and 614. The two collimators 602 and 604 may have been aligned with respect to each other or with other optical parts (respective corresponding filters or mirrors). In operation, the wedges 608 and 610 may be slid in first and fixed with the bonding agent, which resulting in secured positions of the optical part 602. To secure the positions of the optical part 604, the wedges 612 and 614 are slid in and fixed with the bonding agent. As such, both of the two collimators 602 and 604 are now secured without being disturbed. A bonding agent is applied only to the contacts between the optical parts and the wedges. As illustrated, wedges 608, 610, and 614 are bonded to the substrate 600.

One of the features in the present invention is the feasibility that appropriate adjustments can easily made to the components on the substrate. According to one embodiment, the mirrors are set directly on the substrate, simply to touch or adjust the mirror can change the angle of the mirror and hence the incidence angle of a light beam to the filter. This simple process can be used to tune the center wavelength of each (WDM) filter to desired position such as per ITU grid. Properly to align each reflective mirror can control the beam within a given boundary and reposition it to the desired angle and place. Because the mirror is in direct contact with the substrate, the adhesive shrinkage problem can be avoided.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. For example, the mirror array in FIG. 1 may be replaced by a single mirror bar in situations where no accurate control of the filter center wavelengths are needed, optionally, a ridge or other structures can be made on the substrate to give a rough original positioning of the mirrors, filters, and collimators. Accordingly, the scope of the present invention is defined by the appended claims rather than the forgoing description of embodiments.

We claim:

1. An optical device comprising:
   one or more substrates;
   an array of filters, each of the filters having a designated spectral response to transmit only a predetermined wavelength and reflect other wavelengths,
   an array of collimators, each aligned respectively with one of the filters and bonded via one or more wedges to the one or more substrates.

2. The optical device of claim 1 further comprising:
   an array of mirrors configured to successively reflect the reflected other wavelengths to the array of filters.

3. The optical device of claim 1, wherein the one or more wedges are inserted into gaps between one of the collimators and the one or more substrates to hold up aligned positions of the one of the collimators.

4. The optical device of claim 3, wherein the one of the collimators is bonded to the one or more wedges on respective contacts therebetween by applying a bonding agent thereto.

5. The optical device of claim 4, wherein the one or more wedges are bonded to the one or more substrates to secure aligned positions of the one of the collimators.

6. The optical device of claim 3, wherein each of the wedges is so shaped that sliding of the wedges into the gaps will not flip over or up the one of the collimators when being pushed to slide in.

7. The optical device of claim 3, wherein each of the wedges has a cross-section shaped substantially like a right triangle.

8. A method for configuring an optical device, the method comprising:
   placing an array of filters on a substrate, each having a designated spectral response to transmit only a predetermined wavelength and reflect other wavelengths;
   aligning an array of collimators with the filters, each of the filters corresponding to one collimator in the array of collimators and transmitting the predetermined wavelength to the collimator;
   sliding two wedges respectively towards the collimator till respective contacts between the two wedges and the collimator are established; and
   applying a small amount of bonding agent to the respective contacts to bonding the collimator and the wedges so that aligned positions of the collimator are secured.

9. The method of claim 8 further comprising bonding the two wedges to the substrate.

10. The method of claim 9, wherein each of the wedges has a cross-section shaped substantially like a right triangle having a hypotenuse thereof so that each of the wedges has a sliding side on the hypotenuse.

11. The method of claim 9, wherein the sliding of the two wedges respectively towards the collimator comprises facing down the sliding side of each of the wedges; and pushing each of the wedges slowly towards the collimator till the respective contacts are respectively established.

12. The method of claim 11, wherein each of the wedges is so shaped that the sliding of the two wedges respectively towards the collimator will not flip over or up the collimator that has been already aligned With one of the filters.

13. The method of claim 12, wherein each of the wedges has a cross-section shaped substantially like a right triangle.

14. The method of claim 8, wherein aligned positions of the collimator with respect to one of the filters are securely held up by the wedges.

15. The method of claim 8, wherein the placing of the array of filters on the substrate comprising:

placing an array of mirrors configured to successively reflect the reflected other wavelengths to each of the filters; and adjusting an incident angle of each of the filters to ensure that the transmitted wavelength goes into a corresponding one of the collimators.

16. An optical device comprising:

a substrate;

a first and a second array of filters, each of the filters having a designated and distinct spectral response to transmit only a predetermined wavelength and reflect other wavelengths, a first and a second array of collimators, each aligned respectively with one of the filters and bonded via one or more wedges to the substrate, and wherein a multiplexed signal come into one of the filters in the first array that transmits a first predetermined wavelength in the multiplexed signal to one of the collimators in the first array and reflects the other wavelengths in the multiplexed signal to one of the filters in the second array that transmits a second predetermined wavelength in the multiplexed signal to one of the collimators in the second array.

17. The optical device of claim 16, wherein each of the wedges has a cross-section shaped substantially like a right triangle.

18. The optical device of claim 16, wherein the wedges are respectively filled in gaps between one of the collimators and the substrate, and wherein the gaps are created to align one of the collimators with respect to a corresponding one of the filters.

* * * * *